US009917480B1

(12) United States Patent
Weidner et al.

(10) Patent No.: US 9,917,480 B1
(45) Date of Patent: Mar. 13, 2018

(54) METHODS AND APPARATUS FOR EFFICIENT WIRELESS POWER TRANSFER

(71) Applicant: QUALCOMM Incorporated, San Diego, CA (US)

(72) Inventors: Felix Weidner, Munich (DE); Nicholas Athol Keeling, Munich (DE); Joshua Lee, Munich (DE)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/607,167

(22) Filed: May 26, 2017

(51) Int. Cl.
*H04B 5/00* (2006.01)
*H02J 50/12* (2016.01)
*G06K 19/07* (2006.01)
*H01F 38/14* (2006.01)

(52) U.S. Cl.
CPC .......... *H02J 50/12* (2016.02); *G06K 19/0715* (2013.01); *G06K 19/0723* (2013.01); *H01F 38/14* (2013.01); *H04B 5/0031* (2013.01); *H04B 5/0037* (2013.01)

(58) Field of Classification Search
CPC ............. G06K 19/0715; G06K 7/0008; G06K 19/0723; H01F 38/14; H04B 5/0037
USPC ....................................................... 455/41.1
See application file for complete search history.

(56) References Cited

U.S. PATENT DOCUMENTS

| 8,946,938 B2* | 2/2015 | Kesler | B60L 11/182 307/10.1 |
| 9,269,489 B2* | 2/2016 | Wu | H02M 3/33576 |
| 9,391,470 B2 | 7/2016 | Patino et al. | |
| 2011/0204845 A1* | 8/2011 | Paparo | H01F 38/14 320/108 |
| 2013/0088194 A1* | 4/2013 | Hunter | B60L 11/182 320/108 |
| 2014/0252874 A1* | 9/2014 | Niizuma | B60L 11/1829 307/104 |
| 2015/0145475 A1* | 5/2015 | Partovi | H01F 5/003 320/108 |
| 2015/0239354 A1 | 8/2015 | Gorai et al. | |

FOREIGN PATENT DOCUMENTS

| CN | 104834345 A | 8/2015 |
| WO | WO-2016046933 A1 | 3/2016 |

* cited by examiner

*Primary Examiner* — Sonny Trinh
(74) *Attorney, Agent, or Firm* — Knobbe, Martens, Olson & Bear, LLP

(57) ABSTRACT

One aspect of the disclosure provides an apparatus for receiving wireless power. The apparatus includes a power receiving circuit and a processing circuit. The power receiving circuit is configured to couple to a magnetic field generated by a power transmitter during an alignment check. The processing circuit is configured to identify a first operation point of the power receiving circuit and a second operation point of the power transmitter based on the magnetic field during the alignment check. The processing circuit is further configured to adjust a duty cycle of an active component of the power receiving circuit based at least in part on one of the identified first operation point and second operation point.

21 Claims, 11 Drawing Sheets

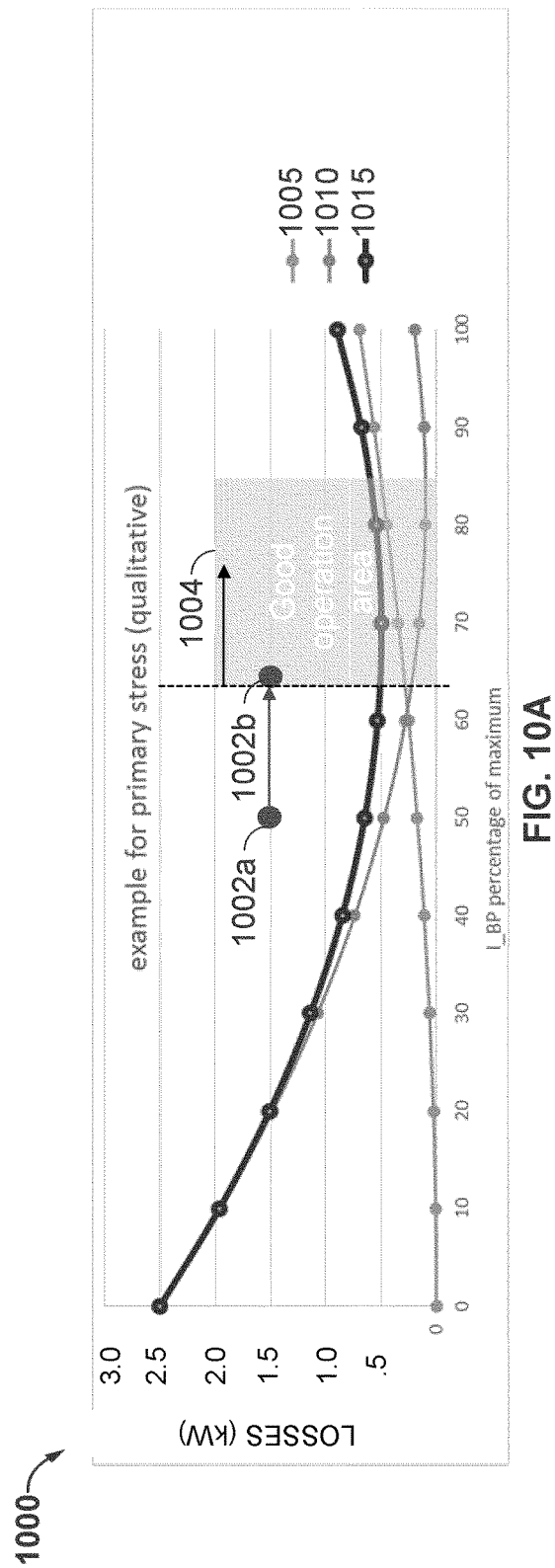

METHODS AND APPARATUS FOR EFFICIENT WIRELESS POWER TRANSFER

BACKGROUND

Field

The present disclosure relates generally to wireless power transfer. More specifically, this disclosure relates to methods and apparatus for performing loss balancing between power transfer units and power receiving units to improve efficiency of the power transfer between the units.

Description of the Related Art

In general, a power transfer unit (PTU) wirelessly transmits power to a power receiving unit (PRU) via a wireless field generated by the PTU. The PTU and the PRU may be magnetically or inductively coupled when a current through an antenna of the PTU induces a voltage in an antenna of the PRU. Such magnetic or inductive coupling between the antennas of the PTU and the PRU may depend on a variety of factors, including horizontal and vertical offset between the antennas. As the coupling between the PTU and the PRU changes, the power transferred from the PTU to the PRU also changes. Additionally, other relationships between the PTU and the PRU may vary dependent on the coupling between the PTU and the PRU and may causes uneven stress or losses at either the PTU or the PRU (as compared to the other of the PTU and the PRU). Losses experienced by the system are typically indicative of the electrical stress that the system is experiencing. As discussed herein, stress may refer to how close a component is to its limits. In an ideal system, the stress and associated losses are equally distributed between the PTU and PRU for the most efficient operation of the combined system. Accordingly, it is desirable to balance the losses between the PTU and the PRU with minimal communication between the PTU and the PRU. Thus, there is a need for methods and apparatus for improving balancing of losses between the PTU and PRU in real time without utilizing communications between the PTU and PRU that is not supported by current wireless power transfer standards.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for receiving wireless power. The apparatus includes a power receiving circuit and a processing circuit. The power receiving circuit is configured to couple to a magnetic field generated by a power transmitter during an alignment check. The processing circuit is configured to identify a first operation point of the power receiving circuit and a second operation point of the power transmitter based on the magnetic field during the alignment check. The processing circuit is further configured to adjust a duty cycle of an active component of the power receiving circuit based at least in part on one of the identified first operation point and second operation point.

Another aspect of the disclosure provides a method of receiving wireless power at a power receiving circuit. The method includes receiving power from a magnetic field generated by a power transmitter during an alignment check. The method also includes identifying a first operation point of the power receiving circuit and a second operation point of the power transmitter based on the magnetic field during the alignment check. The method further includes adjusting a duty cycle of an active component of the power receiving circuit based at least in part on one of the identified first operation point and second operation point.

An additional aspect of the disclosure provides another apparatus for receiving wireless power. The other apparatus includes means for receiving power from a magnetic field generated by a power transmitter during an alignment check. The other apparatus also includes means for identifying a first operation point of the means for receiving power and a second operation point of the power transmitter based on the magnetic field during the alignment check. The other apparatus further includes means for adjusting a duty cycle of an active component of the means for receiving power based at least in part on one of the identified first operation point and second operation point.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 10A is a graph showing losses on an antenna or circuit of a power transfer unit (PTU) of FIG. 6 as a function of a percentage of a maximum current in the antenna of the PTU, in accordance with exemplary implementations of the present disclosure.

Figure 1:
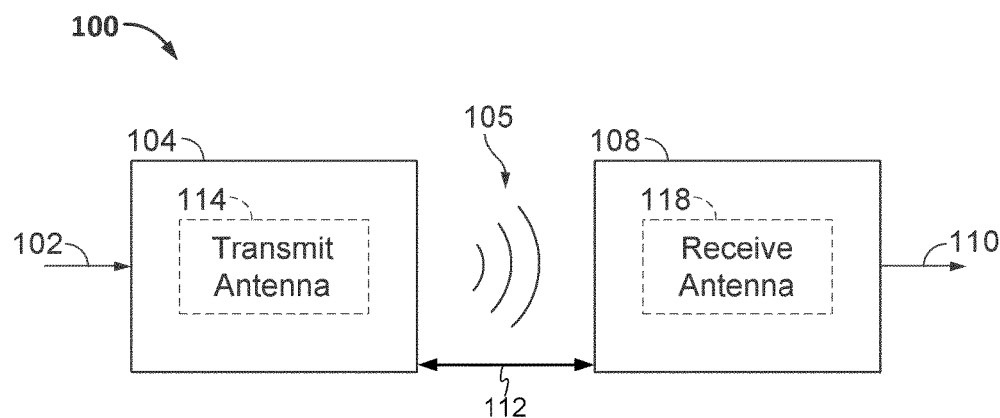
FIG. 1 is a functional block diagram of a wireless power transfer system, in accordance with one exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations and is not intended to represent the only implementations in which the present disclosure may be practiced. The term "exemplary" used throughout this description means "serving as an example, instance, or illustration," and should not necessarily be construed as preferred or advantageous over other exemplary implementations. The detailed description includes specified details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of a wireless power transfer system 100, in accordance with one exemplary implementation. Input power 102 may be provided to a transmitter 104 from a power source (not shown) to generate a wireless (e.g., magnetic or electromagnetic) field 105 for performing wireless power transfer. A receiver 108 may couple to the wireless field 105 and generate output power 110 for storage or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The wireless field 105 may also operate over a longer distance than is considered "near field." The transmitter 104 may include a transmit antenna 114 (e.g., a coil) for transmitting energy to the receiver 108. The receiver 108 may include a receive antenna or coil 118 for receiving or capturing energy transmitted from the transmitter 104. The near-field may correspond to a region in which there are strong reactance fields resulting from the currents and charges in the transmit antenna 114 that minimally radiate power away from the transmit antenna 114. The near-field may correspond to a region that is within about one wavelength (or a fraction thereof) of the transmit antenna 114.

Figure 2:
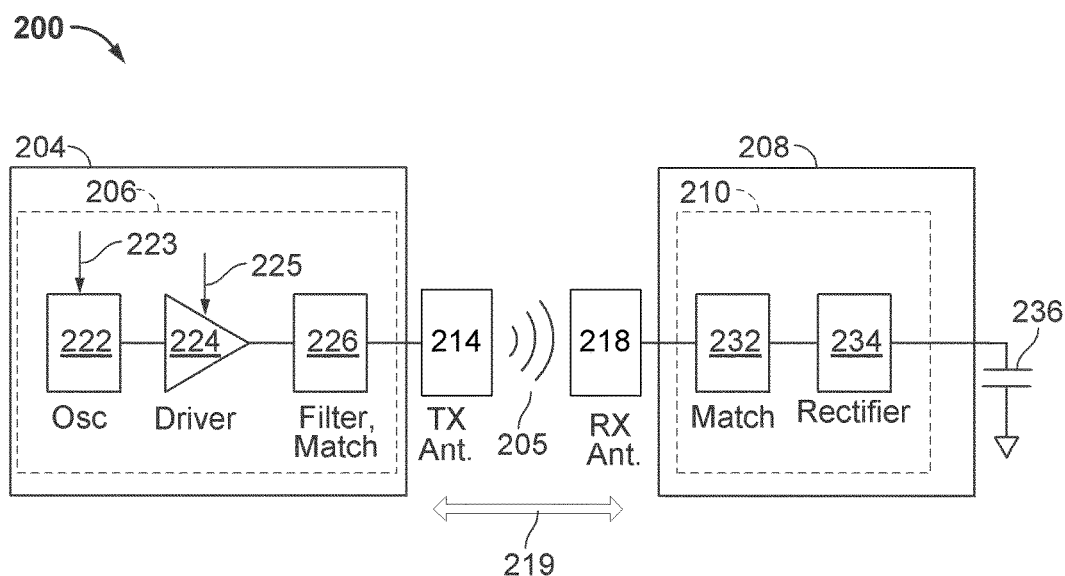
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired or target frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal ($V_D$) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the impedance of the transmit antenna 214. As a result of driving the transmit antenna 214, the transmit antenna 214 may generate a wireless field 205 to wirelessly output power at a level sufficient for charging a battery 236.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, ZigBee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
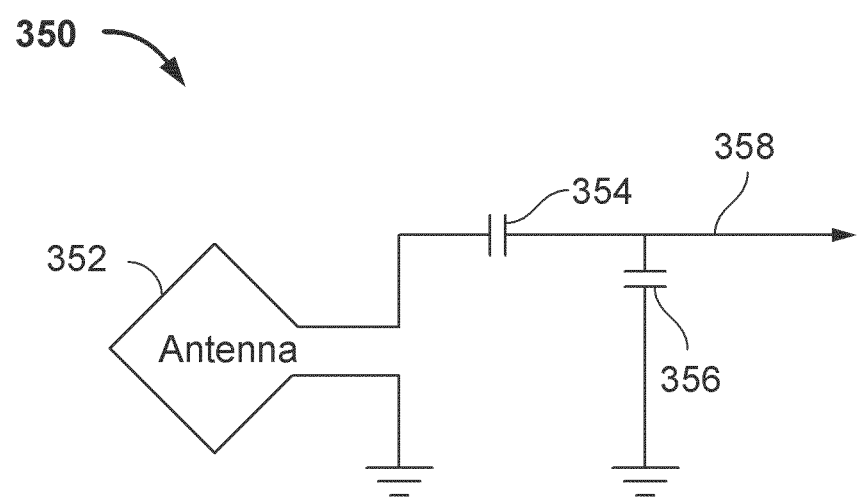
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2 including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown).

The transmit or receive circuitry 350 may form/include a resonant circuit. The resonant frequency of the loop or magnetic antennas is based on the inductance and capacitance. Inductance may be simply the inductance created by the antenna 352, whereas, capacitance may be added to the antenna's inductance to create a resonant structure at a desired or target resonant frequency. As a non-limiting example, a capacitor 354 and a capacitor 356 may be added to the transmit or receive circuitry 350 to create a resonant circuit. For a transmit circuitry, a signal 358 may be an input at a resonant frequency to cause the antenna 352 to generate a wireless field 105/205. For receive circuitry, the signal 358 may be an output to power or charge a load (not shown). For example, the load may comprise a wireless device configured to be charged by power received from the wireless field.

Other resonant circuits formed using other components are also possible. As another non-limiting example, a capacitor may be placed in parallel between the two terminals of the circuitry 350.

Referring to FIGS. 1 and 2, the transmitter 104/204 may output a time varying magnetic (or electromagnetic) field with a frequency corresponding to the resonant frequency of the transmit antenna 114/214. When the receiver 108/208 is within the wireless field 105/205, the time varying magnetic (or electromagnetic) field may induce a current in the receive antenna 118/218. As described above, if the receive antenna 118/218 is configured to resonate at the frequency of the transmit antenna 114/214, energy may be efficiently transferred. The AC signal induced in the receive antenna 118/218 may be rectified as described above to produce a DC signal that may be provided to charge or to power a load.

Figure 4:
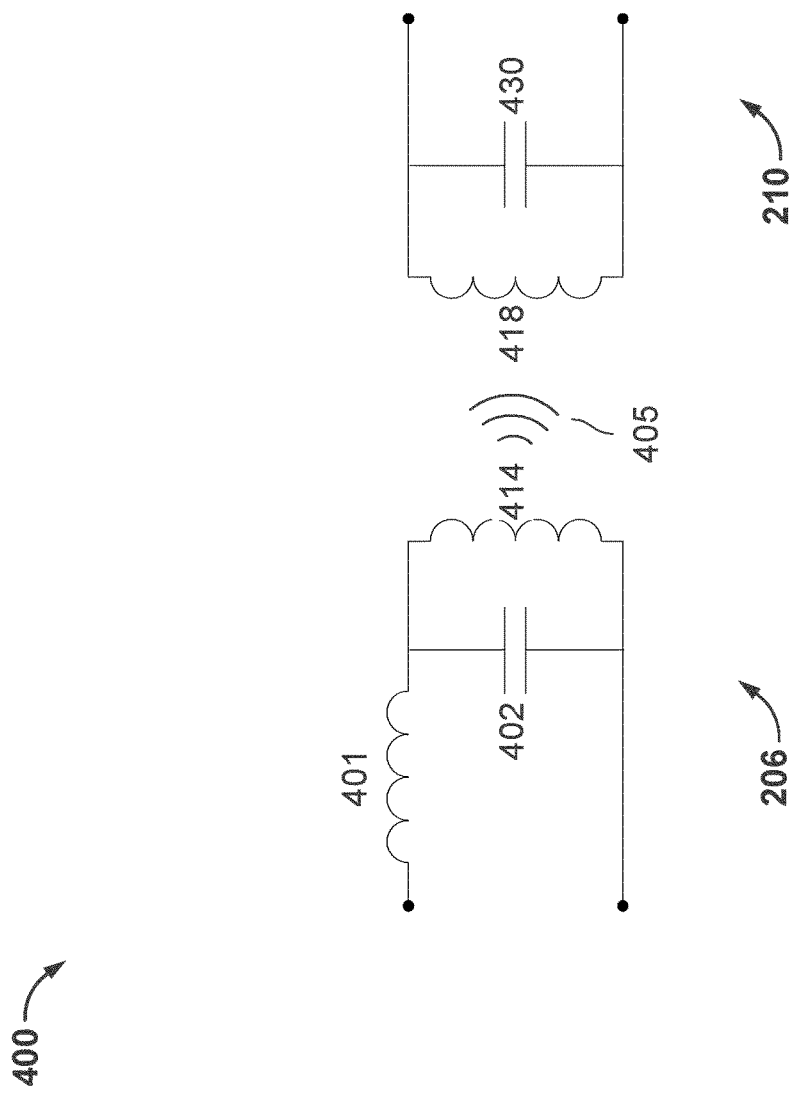
FIG. 4 is a schematic diagram of a portion of the transmit circuitry and the receive circuitry of the wireless power transfer system FIG. 2 including a transmit antenna and a receive antenna, in accordance with exemplary implementations.

FIG. 4 is a schematic diagram of a portion of the transmit circuitry and the receive circuitry of the wireless power transfer system FIG. 2 including a transmit antenna and a receive antenna, in accordance with exemplary implementations. The portion of the transmit circuitry 206 may comprise an antenna 414, an inductor 401, and a resonant capacitor 402. The portion of the receive circuitry 210 may comprise an antenna 418 and a resonant capacitor 430. In some implementations, the portion of the transmit circuitry 206 may generate a magnetic field based on a transmitter current $I_{L1}$ that flows through the antenna 414. This transmitter current $I_{L1}$ may be generated by one or more components that are not shown in this figure. The current $I_{L1}$ flowing through the antenna 414 may generate a wireless field 405. When the antenna 418 is exposed to the wireless field 405, a voltage may be induced through the antenna 418 and cause a current $I_{L2}$ to be generated in one or more components that are not shown in this figure. The current $I_{L2}$ may flow from the antenna 418 and into the receive circuitry 210. The portion of the transmit circuitry 206 and the portion of the receive circuitry 210 may magnetically or inductively couple via their respective antennas 414 and 418, respectively. The coupling between the portion of the transmit circuitry 206 and the portion of the receive circuitry 210 may be measured by a coupling factor k. The power generated at an output of the portion of the receive circuitry 210 may be calculated using Equation 1 below:

$$P_{out} \approx k * I_{L1} * I_{L2} \quad \text{(Equation 1)}$$

Losses in the antenna 414 and 418 and other components of the portion of the transmit circuitry 206 and the portion of the receive circuitry 210 during wireless power transfer may vary based on the coupling (e.g., the coupling factor k). When the losses are balanced evenly between the portion of the transmit circuitry 206 and the portion of the receive circuitry 210, the combined wireless transfer system 400 may be most efficient. Accordingly, when losses are evenly balanced between the portion of the transmit circuitry 206 and the portion of the receive circuitry 210, a ratio between the input power (power driving the antenna 414) and the output power (power output by the antenna 418) may be greater than other distributions of losses. Losses in the portion of the transmit circuitry 206 and the portion of the receive circuitry 210 may be balanced during wireless power transfer by balancing currents in the antennas 414 and 418, respectively. Real-time active control of both the portion of the transmit circuitry 206 and the portion of the receive circuitry 210 may provide ideal balancing of the currents in the antennas 414 and 418. However, such active controls may require specific information be communicated between the portion of the transmit circuitry 206 and the portion of the receive circuitry 210, contrary to existing standards requirements when operating in a wireless power transfer or wireless charging mode. Accordingly, such balancing during wireless power transfer or charging may be of limited interoperability due to a lack of coverage of such communications by the standards. In some implementations, the balancing of the stresses of the PTU and/or PRU may lead to or provide for balancing of the losses of the PTU and/or the PRU.

Figure 5:
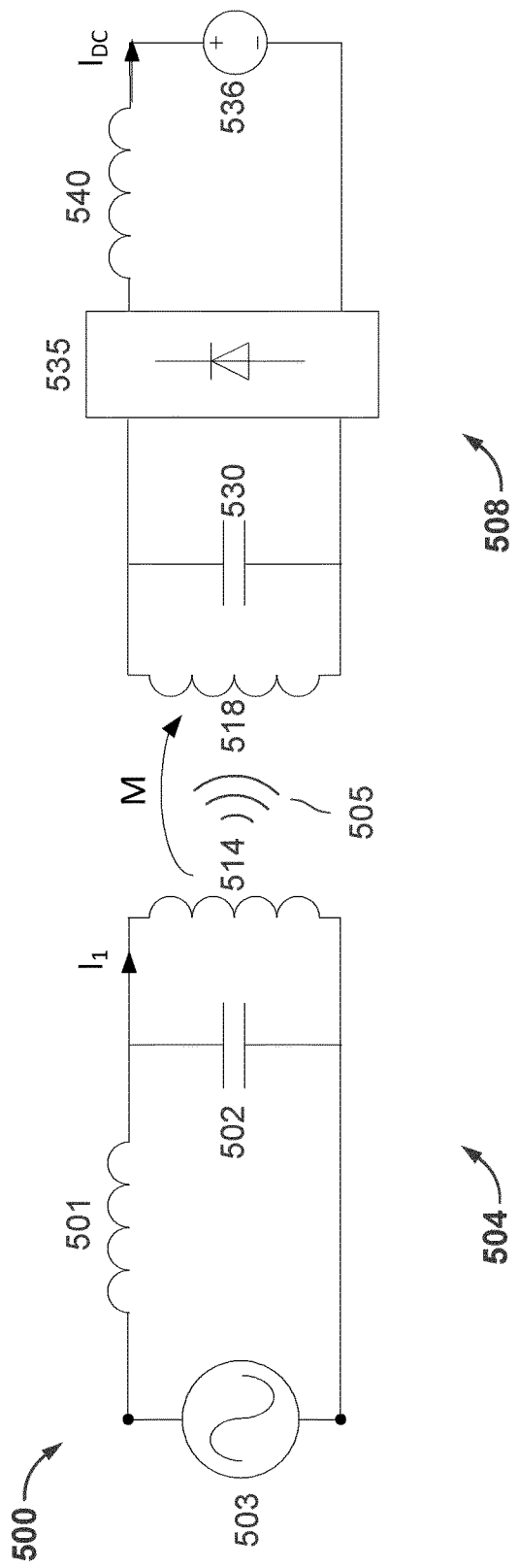
FIG. 5 is a schematic diagram of a wireless power transfer system, in accordance with exemplary implementations of the present disclosure.

FIG. 5 is a schematic diagram of a wireless power transfer system, in accordance with exemplary implementations of the present disclosure. The wireless power transfer system 500 may include a PTU 504 (corresponding to the PTU 104) and a PRU 508 (corresponding to the PRU 108). The PTU 504 may include an antenna 514, an inductor 501, a resonant capacitor 502, and an adjustable power supply 503. In some implementations, the adjustable power supply 503 may comprise an inverter and a power factor controller (PFC). The PRU 508 may include an antenna 518, a resonant capacitor 530, an active secondary component 535 (e.g., a current doubler), an inductor 540, and a load 536.

The antenna 514 may have a current $I_1$ flowing through it, causing it to generate a magnetic field 505. When the antenna 518 is exposed to the magnetic field 505, a voltage may be induced in the antenna 518, which causes a current to be generated in the PRU 508. This generated current may be manipulated by the active secondary component 535 to generate a current $I_{DC}$. The current $I_{DC}$ may flow through the inductor 540 and into the load 536 to charge or power the load 536. In some implementations, the load 536 may comprise a battery (e.g., a battery of an electric vehicle).

As discussed herein, the balancing of the losses may not be feasible or possible during wireless charging due to a lack of specific signals being communicated between the PTU 504 and the PRU 508. In some implementations, the specific signals may comprise communications of power levels or transmission levels. However, a magnetic coupling between the antenna 514 and the antenna 518 during an alignment check or alignment process of the PTU antenna 514 and the PRU antenna 518 may be similar to a magnetic coupling between the antenna 514 and the antenna 518 during wireless power transfer or charging. Accordingly, the alignment check or alignment process may be used to predict losses in each of the PTU 504 (antenna and circuit) and the PRU 508 (antenna and circuit). The alignment check occurs prior to wireless power transfer between the PTU 504 and the PRU 508. During the alignment check, an alignment of the PTU 504 and the PRU 508 is verified to ensure maximum wireless transfer efficiency. Alignment of the PTU 504 and the PRU 508 may comprise an aligning of the PTU 504 and the PRU 508 in space that provides the most efficient wireless power transfer.

Figure 6:
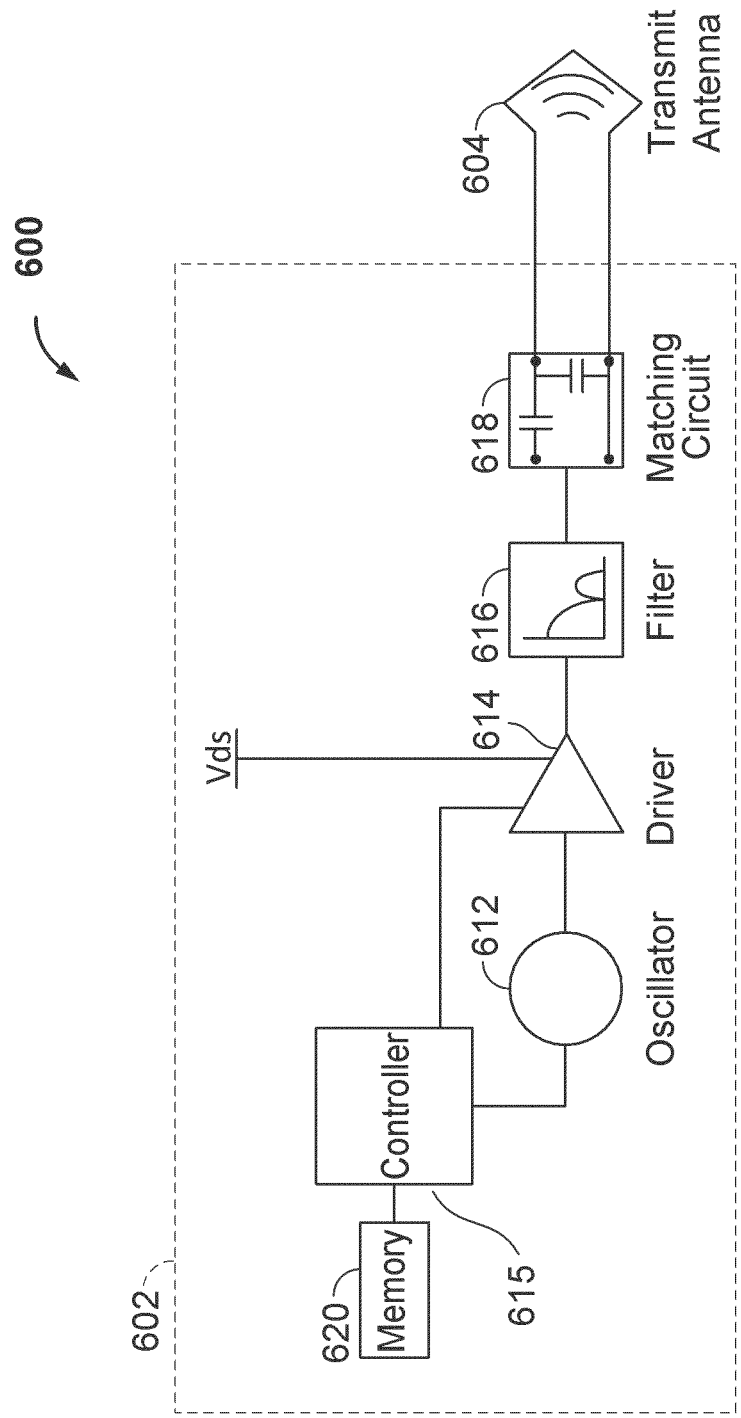
FIG. 6 is a functional block diagram of a transmitter that may be used in an inductive power transfer system, in accordance with exemplary implementations of the present disclosure.

FIG. 6 is a simplified functional block diagram of a transmitter that may be used in an inductive power transfer system, in accordance with exemplary implementations of the present disclosure. As shown in FIG. 6, the transmitter (PTU) 600 includes transmit circuitry 602 and a transmit antenna 604 operably coupled to the transmit circuitry 602. The transmit antenna 604 may be configured as the transmit antenna 214 as described above in reference to FIG. 2. In some implementations, the transmit antenna 604 may be a coil (e.g., an induction coil). In some implementations, the transmit antenna 604 may be associated with a larger structure, such as a table, mat, lamp, or other stationary configuration. The transmit antenna 604 may be configured to generate an electromagnetic or magnetic field. In an exemplary implementation, the transmit antenna 604 may be configured to transmit power to a receiver device within a charging region at a power level sufficient to charge or power the receiver device.

The transmit circuitry 602 may receive power through a number of power sources (not shown). The transmit circuitry 602 may include various components configured to drive the transmit antenna 604. In some exemplary implementations, the transmit circuitry 602 may be configured to adjust the transmission of wireless power based on the presence and constitution of the receiver devices as described herein. As such, the transmitter 600 may provide wireless power efficiently and safely.

The transmit circuitry 602 may further include a controller 615. In some implementations, the controller 615 may be a micro-controller. In other implementations, the controller 615 may be implemented as an application-specified integrated circuit (ASIC). The controller 615 may be operably connected, directly or indirectly, to each component of the transmit circuitry 602. The controller 615 may be further configured to receive information from each of the components of the transmit circuitry 602 and perform calculations based on the received information. The controller 615 may be configured to generate control signals for each of the components that may adjust the operation of that component. As such, the controller 615 may be configured to adjust the power transfer based on a result of the calculations performed by it.

The transmit circuitry 602 may further include a memory 620 operably connected to the controller 615. The memory 620 may comprise random-access memory (RAM), electrically erasable programmable read only memory (EEPROM), flash memory, or non-volatile RAM. The memory 620 may be configured to temporarily or permanently store data for use in read and write operations performed by the controller 615. For example, the memory 620 may be configured to store data generated as a result of the calculations of the controller 615. As such, the memory 620 allows the controller 615 to adjust the transmit circuitry 602 based on changes in the data over time.

The transmit circuitry 602 may further include an oscillator 612 operably connected to the controller 615. The oscillator 612 may be configured as the oscillator 222 as described above in reference to FIG. 2. The oscillator 612 may be configured to generate an oscillating signal (e.g., radio frequency (RF) signal) at the operating frequency of the wireless power transfer. In some exemplary implementations, the oscillator 612 may be configured to operate at any of a number of frequencies (e.g., 85 kHz or the 6.78 MHz ISM frequency band). The controller 615 may be configured to selectively enable the oscillator 612 during a transmit phase (or duty cycle). The controller 615 may be further configured to adjust the frequency or a phase of the oscillator 612 which may reduce out-of-band emissions, especially when transitioning from one frequency to another. As described above, the transmit circuitry 602 may be configured to provide an amount of power to the transmit antenna 604, which may generate energy (e.g., magnetic flux) about the transmit antenna 604.

The transmit circuitry 602 may further include a driver circuit 614 operably connected to the controller 615 and the oscillator 612. The driver circuit 614 may be configured as the driver circuit 224 as described above in reference to FIG. 2. The driver circuit 614 may be configured to drive the signals received from the oscillator 612, as described above.

The transmit circuitry 602 may further include a low pass filter (LPF) 616 operably connected to the transmit antenna 604. The low pass filter 616 may be configured as the filter portion of the filter and matching circuit 226 as described above in reference to FIG. 2. In some exemplary implementations, the low pass filter 616 may be configured to receive and filter an analog signal of current and an analog signal of voltage generated by the driver circuit 614. The analog signal of current may comprise a time-varying current signal, while the analog signal of current may comprise a time-varying voltage signal. In some implementations, the low pass filter 616 may alter a phase of the analog signals. The low pass filter 616 may cause the same amount of phase change for both the current and the voltage, canceling out the changes. In some implementations, the controller 615 may be configured to compensate for the phase change caused by the low pass filter 616. The low pass filter 616 may be configured to reduce harmonic emissions to levels that may prevent self-jamming. Other exemplary implementations may include different filter topologies, such as notch filters that attenuate specified frequencies while passing others.

The transmit circuitry 602 may further include a fixed impedance matching circuit 618 operably connected to the low pass filter 616 and the transmit antenna 604. The matching circuit 618 may be configured as the matching portion of the filter and matching circuit 226 as described above in reference to FIG. 2. The matching circuit 618 may be configured to match the impedance of the transmit circuitry 602 (e.g., 50 ohms) to the transmit antenna 604. Other exemplary implementations may include an adaptive impedance match that may be varied based on measurable transmit metrics, such as the measured output power to the transmit antenna 604 or a DC current of the driver circuit 614. The transmit circuitry 602 may further comprise discrete devices, discrete circuits, and/or an integrated assembly of components.

Transmit antenna 604 may be implemented as an antenna strip with the thickness, width and metal type selected to keep resistance losses low.

Figure 7:
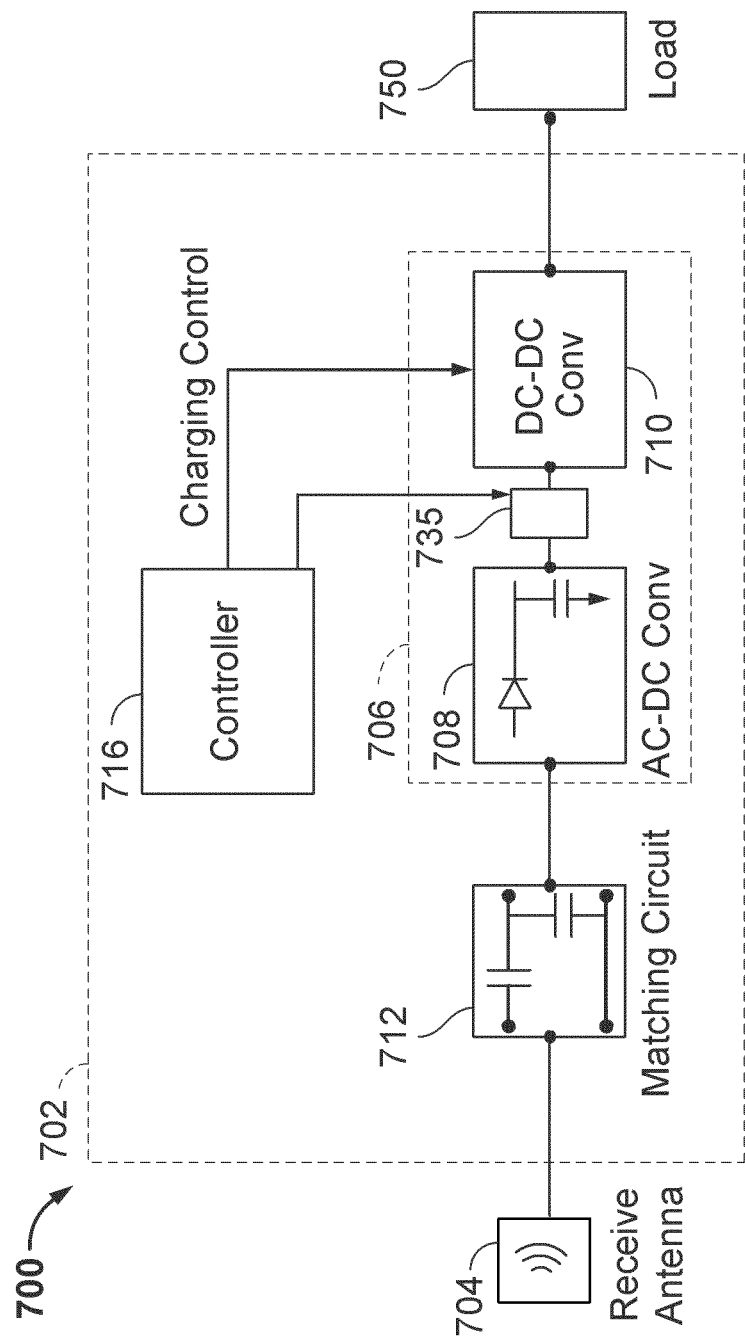
FIG. 7 is a functional block diagram of a receiver that may be used in the inductive power transfer system, in accordance with exemplary implementations of the present disclosure.

FIG. 7 is a block diagram of a receiver, in accordance with an implementation of the present disclosure. As shown in FIG. 7, a receiver (PRU) 700 includes a receive circuitry 702, a receive antenna 704, and a load 750. The receiver 700 further couples to the load 750 for providing received power thereto. Receiver 700 is illustrated as being external to device acting as the load 750 but may be integrated into load 750. The receive antenna 704 may be operably connected to the receive circuitry 702. The receive antenna 704 may be configured as the receive antenna 418 as described above in reference to FIG. 4. In some implementations, the receive antenna 704 may be tuned to resonate at a frequency similar to a resonant frequency of the transmit antenna 404, or within a specified range of frequencies, as described above. The receive antenna 704 may be similarly dimensioned with transmit antenna 404 or may be differently sized based upon the dimensions of the load 750. The receive antenna 704 may be configured to couple to the magnetic field generated by the transmit antenna 404, as described above, and provide an amount of received energy to the receive circuitry 702 to power or charge the load 750.

The receive circuitry 702 may be operably coupled to the receive antenna 704 and the load 750. The receive circuitry may be configured as the receive circuitry 210 as described above in reference to FIG. 2. The receive circuitry 702 may be configured to match an impedance of the receive antenna 704, which may provide efficient reception of wireless power. The receive circuitry 702 may be configured to generate power based on the energy received from the receive antenna 704. The receive circuitry 702 may be configured to provide the generated power to the load 750. In some implementations, the receiver 700 may be configured to transmit a signal to the transmitter 400 indicating an amount of power received from the transmitter 400.

The receive circuitry 702 may include a processor-signaling controller 716 configured to coordinate the processes of the receiver 700 described below.

The receive circuitry 702 provides an impedance match to the receive antenna 704. The receive circuitry 702 includes power conversion circuitry 706 for converting a received energy into charging power for use by the load 750. The power conversion circuitry 706 includes an AC-to-DC converter 708 coupled to a DC-to-DC converter 710. The AC-to-DC converter 708 rectifies the AC energy signal received at the receive antenna 704 into a non-alternating power while the DC-to-DC converter 710 converts the rectified AC energy signal into an energy potential (e.g., voltage) that is compatible with the load 750. Various AC-to-DC converters are contemplated including partial and full rectifiers, regulators, bridges, doublers, as well as linear and switching converters. In some implementations, the AC-DC converter 708 may correspond to the active secondary component 535 of FIG. 5. In some implementations, the receive circuitry 702 may include a standalone active secondary component 735 that corresponds to the active secondary component 535.

The receive circuitry 702 may further include a matching circuit 712. The matching circuit 712 may comprise one or more resonant capacitors in either a shunt or a series configuration. In some implementations these resonant capacitors may tune the receive antenna to a specific frequency or to a specific frequency range (e.g., a resonant frequency).

The load 750 may be operably connected to the receive circuitry 702. The load 750 may be configured as the battery 436 as described above in reference to FIG. 4. In some implementations the load 750 may be external to the receive circuitry 702. In other implementations the load 750 may be integrated into the receive circuitry 702.

Following the inductive power transfer system introduced in FIGS. 6 and 7, the wireless transfer of power between a power transfer unit (PTU) 600 (e.g., the transmitter 600 of FIG. 6) and a power receive unit (PRU) 700 (e.g., the receiver 700 of FIG. 7) directly relates to a transmit current that feeds the PTU's antenna (e.g., antenna 604). Based on the transmit current of the PTU 600, a magnetic field having a magnetic field strength is generated by the PTU's antenna 604. The magnetic field strength determines, at least in part, the voltage induced at the PRU 700. An efficiency of the PTU 600 with regard to power transfer may depend, at least in part, on currents and voltages across components of the PTU 600 (e.g., with regard to power dissipation, etc.).

The wireless transfer of power between the PTU 600 and the PRU 700 also depends on the coupling between the PTU antenna 604 and the PRU antenna 704. The coupled between the antennas 604 and 704 may depend, at least in part, on horizontal and vertical offsets between the antenna 604 and 704. As one or both of the horizontal and vertical offset increase, the coupled may drop. In some implementations, there may be a greater than fifty percent (>50%) variation in the coupling over a range of horizontal and vertical offsets.

When generating the magnetic field, the PTU 600 may be exposed to one or more load impedances based on one or more PRUs 700 that couple to the magnetic field to receive power. In some implementations, the load impedances change based on a position of the PRU 700 on a charging pad or within magnetic field of the PTU 600. The load impedances can also change based on the power delivered to the PRU device. These load impedances can affect the power transfer efficiency of the PTU 600.

One or more of the controller 615 of the PTU 600 or the controller 716 of the PRU 700 may be configured to determine the losses and/or adjust the stresses of one or both of the PTU 600 and the PRU 700 and their corresponding components. For sake of simplicity, the discussion herein will focus on the controller 716 of the PRU 700 performing the loss determination. In some implementations, due to the lack of communications regarding currents in the PTU 600 and the PRU 700 during wireless power transfer, loss determination and prediction may be performed during alignment of the PTU 600 and PRU 700 (e.g., alignment of the antennas 604 and 704, respectively). During the alignment of the PTU 600 and the PRU 700, one or both of the PTU 600 and the PRU 700 may operate at known set points. For example, during alignment, the PTU 600 may generate the magnetic field at 25% or other ratio of its maximum current.

In some implementations, the controller 716 may predict losses in the PTU 600 and the PRU 700 based on parameters checked during the alignment check, before any power is transferred from the PTU 600 to the PRU 700. The controller 716 may thus determine an operating point for a duty cycle of the PRU 700 (e.g., a control of a power conversion or similar circuitry in the PRU 700). The controller 716 may determine the best operating point that reduces losses and stress on components in both the PTU 600 and the PRU 700. The controller 716 may select the duty cycle of the PRU 700 power conversion or similar circuitry before power transfer between the PTU 600 and the PRU 700 begins. Such a determination by the controller 716 thus occurs before power transfer begins and without further communication between the PTU 600 and the PRU 700 that may not be allowed in certain standards.

While performing the alignment check, the controller 716 may determine that alignment is nearly complete, such that the positions of the PTU 600 and the PRU 700 are relatively fixed and ready for wireless power transfer to begin. Additionally, or alternatively, based on an assumption that the positions of the PTU 600 and the PRU 700 will not move substantially during wireless power transfer, the controller 716 may begin to perform the losses determination. The controller 716 may identify a current induced in the antenna 704 based on exposure to the magnetic field generated by the PTU 600. The controller 716 may know that the antenna 604 of the PTU 600 is being fed with an alignment check sense current. In some implementations, the alignment check sense current may be set by standards (e.g., global standards, national standards, industry standards, work group standards, etc.). For example, the Alliance for Wireless Power (A4WP) may establish the alignment check sense current value. The A4WP alignment check sense current fed into the antenna 604 of the PTU 600 for alignment check purposes may be set at one quarter (25%) of the maximum current of the PTU antenna 604. Accordingly, the controller 716 may be aware that the PTU 600 is operating at 25% of its maximum current. Thus, if the maximum current of the PTU antenna 604 is 20 A, then the alignment check sense current with which the PTU antenna 604 is fed is 5 A.

In some implementations, the controller 716 may convey parameters of the PRU 700 to the PTU 600 (e.g., via the receive antenna 704 or via another communication means) to allow the PTU to determine losses and perform the balancing described herein. In some implementations, the PRU 700 parameters and the PTU 600 parameters may be conveyed to an external system that determines the losses and perform the balancing described herein. In some implementations, the PTU 600 or an external controller may perform the loss determination and balancing dependent on the control strategy being utilized.

The controller 716 may further measure a short circuit current of the antenna 704 in the PRU 700 while the PTU 600 operates at the alignment check sense current. Accordingly, the controller 716 may perform the short circuit current measurement when the alignment of the PTU 600 and the PRU 700 is almost completed, as noted above. In some implementations, the short circuit current may be measured across the antenna 704 directly or in the matching circuit 712. For example, the measured short circuit current of the antenna 704 may be 5 A. Once the short circuit current of the antenna 704 is determined based on the PTU 600 being fed with the alignment check sense current, the controller may be prepared to determine the losses of the PTU 600 and the PRU 700.

The controller 716 may further compare the short circuit current of the antenna 704 needed to fulfill the load 750 power request with the measured short circuit current. For example, the controller 716 may determine that the short circuit current needed to fulfill the load 750 is 10 A. The controller may then use the short circuit current of the antenna 704 at the 10 A needed to fulfill the load 750 to determine the stress on the PTU antenna 604. The controller 716 may determine the stress on the PTU antenna 604 based on the 10 A maximum short circuit current (e.g., 10 A and 100% load of the antenna 704). Specifically, the controller 716 may determine that the antenna 604 would operate at 50% stress when antenna 704 provides the full 10 A to the load 750. Based on the knowledge that 25% antenna 604 stress generated 5 A at antenna 704, the controller 716 could determine that at 10 A at antenna 704, antenna 604 stress would be at 50%. The controller 716 may then calculate a stress of the components of the PRU 700 based on the determined stress of the PRU antenna 704 (100%) and a stress of the components of the PTU 600 based on the determined stress of the PTU antenna 604 (50%). In some implementations, a substantially linear relationship may exist between the PTU antenna 604 stress and PTU 600 components stress. Similarly, a substantially similar relationship may exist between the PRU antenna 704 and the PRU 700 components stress. In some implementations, the stress value(s) or point(s) at which the losses are at or near a minimum may be known and stored in a memory 620 of the PTU 600 or the PRU 700 (not shown). In some implementations, a target stress (Ts) may be determined based on the known and/or stored stress value.

Based on the determined stress values, the controller 716 may adjust the stresses of one or more sub-systems of the PTU 600 and the PRU 700 so that both the PTU 600 and the PRU 700 are operating at ideal operation points. For example, the controller 716 may adjust a duty cycle of one or more components of the PRU 700 to adjust the stresses of the PTU 600 and PRU 700 subsystems, thereby adjusting combined stresses of the PTU 600 and PTU 700. The controller 716 may, for example, adjust the duty cycle of the active secondary component 735 or one or more of the components of the AC-DC converter 708. By setting the duty cycle of the PRU 700 before the wireless power transfer system is transferring power (e.g., during the alignment check), the controller 716 may "predict" the stress of the PTU 600 and the PRU 700 components.

The controller 716 may calculate multiple duty cycles for the PRU 700 based on different desired goals. Of the calculated duty cycles, the controller 716 may select the duty cycle to provide the best combined efficiency between the PTU 600 and the PRU 700. In some implementations, the selected duty cycle may be the highest or the lowest duty cycle or an average of a number of duty cycles. In some implementations, the active secondary component 735 may perform other functions that ensure safe operation of the PRU 700 and the combined PTU 600/PRU 700 system. In some implementations, the selected duty cycle may improve efficiency. However, the duty cycle may be ignored or overridden under some circumstances if needed. In some implementations, the duty cycle may also be used in combination with (e.g. added to) the other duty cycles. For example, when the PTU antenna 604 operates at 50% stress while the PRU antenna 704 operates at 100% stress and desired PTU 600 stress of 65%, the controller 716 may determine that the PRU 700 operates at 77% stress based on Equation 2 below:

$$\frac{S_{TA} * S_{RA}}{T_S} = 1 - u \qquad \text{(Equation 2)}$$

Where:
 $S_{TA}$=the PTU antenna 604 stress;
 $S_{RA}$=the PRU antenna 704 stress;
 $T_S$=the target stress desired; and
 u=the duty cycle of the PRU 700.
Based on the values identified above, the controller 716 may use Equation 2 to generate a minimum duty cycle of $$0.23 \left( \frac{50\% \cdot 100\%}{65\%} = 1 - u\% \right)$$

for the active secondary component 735 with a desired 65% stress for the PTU 600.

Alternatively, when the PTU antenna 604 operates at 50% stress while the PRU antenna 704 operates at 100% stress and given a desired PTU antenna 604 and PRU antenna 704 current ratio of 0.8 (e.g., based on antenna resistances), the controller 716 may determine that the PRU 700 operates at 79% stress based on Equation 3 below:

$$\sqrt{\frac{S_{TA} * S_{RA}}{CR}} = 1 - u \qquad \text{(Equation 3)}$$

Where:
$S_{TA}$=the PTU antenna 604 stress;
$S_{RA}$=the PRU antenna 704 stress;
CR=the target current ratio; and
u=the duty cycle of the PRU 700.
Based on the values identified above, the controller 716 may determine, using Equation 3, an ideal duty cycle of $$0.21\left(\sqrt{\frac{50\% \cdot 100\%}{0.8}} = 1 - u\%\right)$$

for the active secondary component 735 with a desired ideal current ratio of 0.8 between the PTU antenna 604 and the PRU antenna 704. Once the duty cycle is determined and the stresses are determined (based on the duty cycle of 0.23) between the PTU 600 and the PRU 700 accordingly, the controller 716 may allow the alignment check to terminate. In some implementations, the stresses of the PTU 600 and the PRU 700 may not be adjusted until the alignment check is completed.

As mentioned herein, the duty cycle may be calculated based on one or more goals. For example, if the desired PTU 600 stress is 85% as opposed to the 65% determined above, then the stresses of the PTU 600 and the PRU 700 may be varied. Similarly, if the current ratio between the PTU antenna 604 and the PRU antenna 704 is desired to be different, then the stresses of the PTU 600 and the PRU 700 may be varied.

Figure 8:
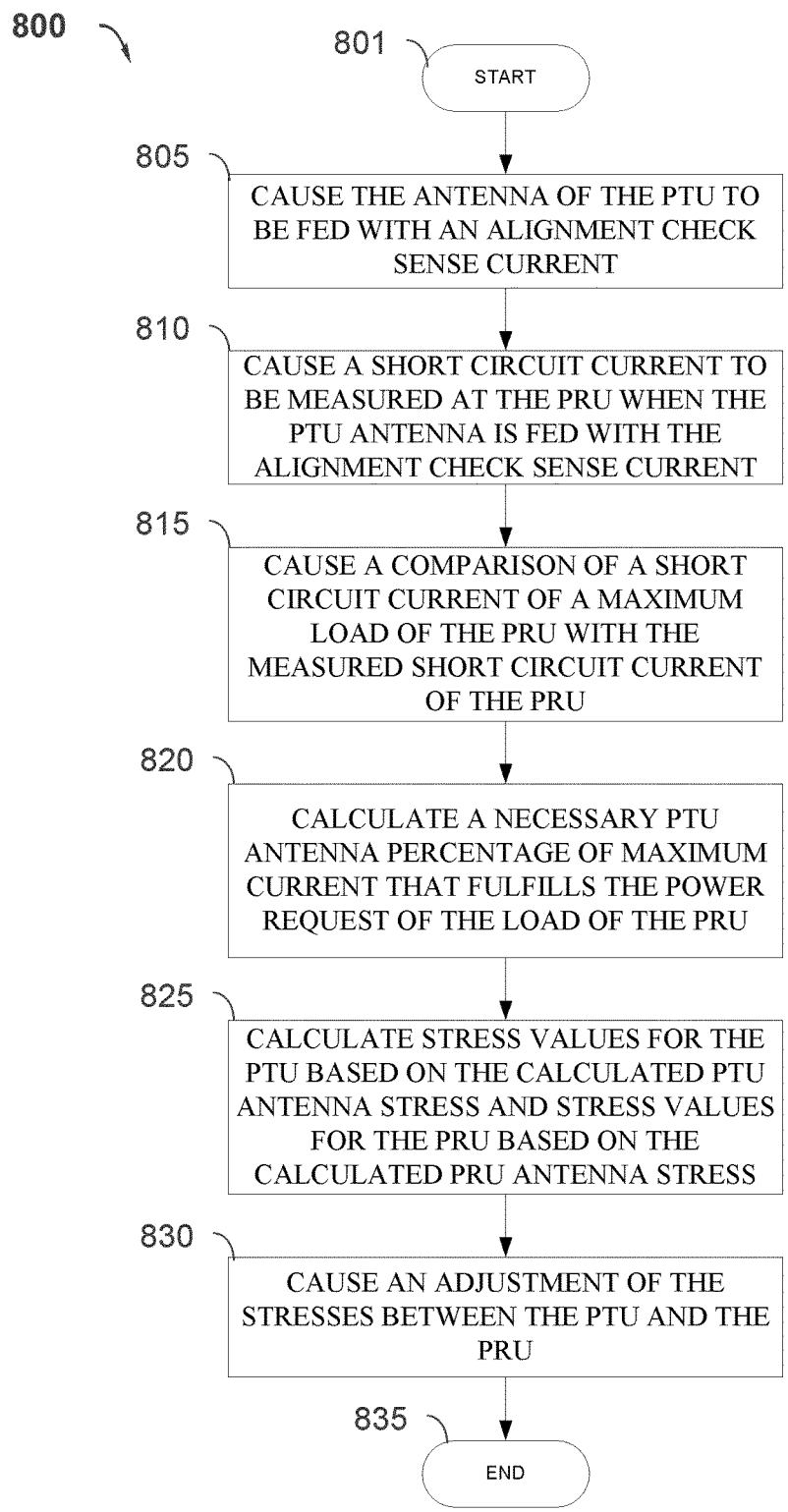
FIG. 8 is a flowchart that includes a plurality of steps of a method of determining losses in the antennas and circuits of the PTU and the PRU of FIG. 5, in accordance with exemplary implementations of the present disclosure.

FIG. 8 is a flowchart that includes a plurality of steps of a method 800 of determining losses in the antennas and circuits of the PTU and the PRU of FIG. 5, in accordance with exemplary implementations of the present disclosure. For example, the method 800 could be performed by the one or more of a controller of the PTU 600 (615) or a controller of the PRU 700 (715). In some implementations, the method 800 may be performed by a controller external to both the PTU 600 and the PRU 700, for example a controller of an electric vehicle or an alignment system. A person having ordinary skill in the art will appreciate that the method 800 may be implemented by other suitable devices and systems. Although the method 800 is described herein with reference to a particular order, in various aspects, blocks herein may be performed in a different order, or omitted, and additional blocks may be added. In some implementations, one or more of the block of the method 800 may be used for both the stress prediction or determination in the PTU 600 and the PRU 700 as well as checking of alignment of the PTU antenna 604 with the PRU antenna 704.

The method 800 begins at block 801 and proceeds to block 805. Block 805 of the method 800 includes causing the antenna 714 of the PTU 600 to be fed with an alignment check sense current. Once the PTU antenna 604 is fed with the appropriate alignment check sense current, the method 800 proceeds to block 810.

Block 810 includes causing a short circuit current to be measured at the PRU 700 when the PTU antenna 604 is fed with the alignment check sense current. In some implementations, the short circuit current may be measured across the PRU antenna 704 or at another location of the PRU 700. Once the short circuit current of the PRU antenna 704 is determined based on the PTU antenna 604 being fed with the alignment check sense current, the method 800 proceeds to block 815.

Block 815 includes causing a comparison of a short circuit current that fulfills a load (not shown) of the PRU 700 power request with the measured short circuit current of the PRU 700. Once the comparison of the short circuit current that fulfills the power request of the load of the PRU 700 with the measured short circuit of the PRU antenna 704 is complete, the method 800 proceeds to block 820.

Block 820 includes calculating a necessary PTU antenna 604 percentage of maximum current that fulfills the power request of the load of the PRU 700. Once the stress of the PTU antenna 604 is calculated based on the maximum stress of the PRU antenna 704, the method 800 proceeds to block 825.

Block 825 includes calculating stress values for the PTU 600 based on the calculated PTU antenna 604 stress and stress values for the PRU 700 based on the calculated PRU antenna stress 704. Once the stress values for the PTU 600 and the PRU 700 are calculated, the method 800 proceeds to block 830.

Block 830 includes causing an adjustment of the stress between the PTU 600 and the PRU 700 for ideal distribution of stress and ideal efficiency of power transfer operation of the wireless power transfer system including the PTU 600 and the PRU 700. Once the adjustment of the stress is complete based on the adjustment of the duty cycle of the active secondary component 735, the method 800 terminates at block 835.

Figure 9:
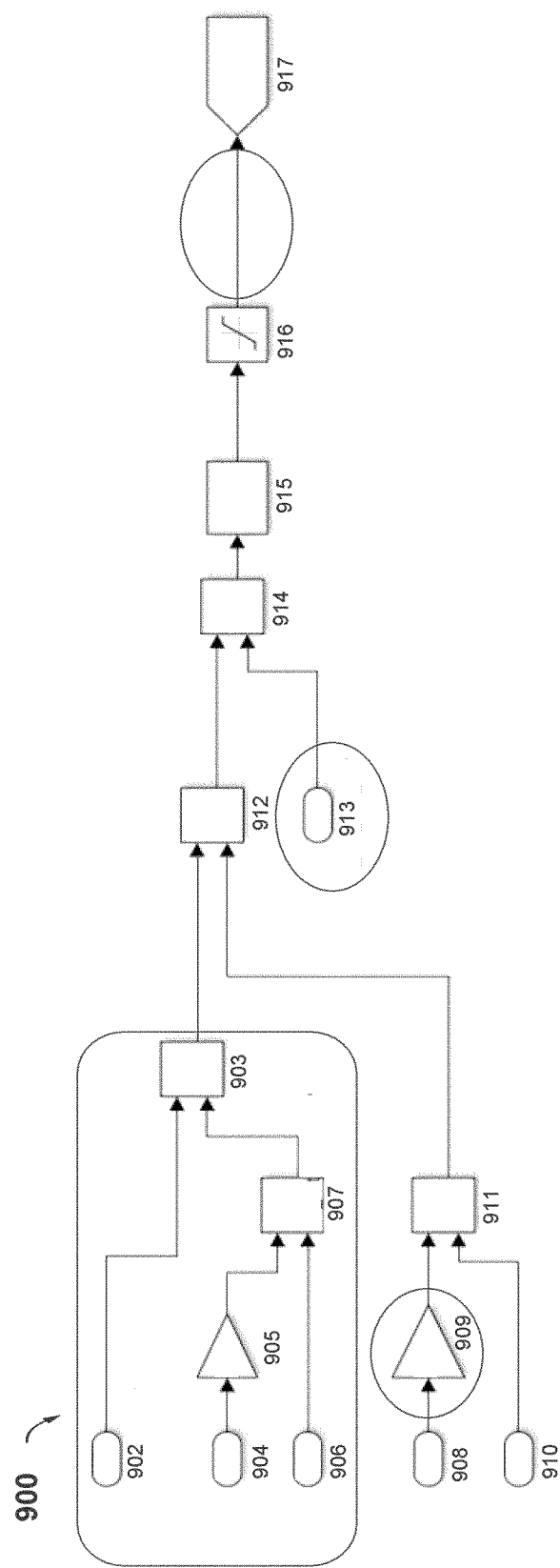
FIG. 9 is a computational block diagram of a model of a method of determining losses in the antennas and circuits of the PTU and the PRU, in accordance with exemplary implementations of the present disclosure.

FIG. 9 is a computational block diagram 900 of a model of a method of determining stress in the antennas and circuits of the PTU and the PRU, in accordance with exemplary implementations of the present disclosure. Blocks 902-907 of the diagram 900 may determine or calculate a nominal output current of the PTU and the PRU. In some implementations, the nominal output current is the lowest of the maximum output current of the PRU and the maximum current at a nominal output voltage of the PTU. For example, if the PTU has a maximum current of 30 A but the PRU has a maximum output current of 15 A, the nominal output current may be 15 A. In some implementations, the maximum current of the PTU may be calculated or based on a power rating of the PTU, for example based on an approximate efficiency, a maximum power of the PTU, and the nominal output voltage of the PTU. In some implementations, the maximum output current of the PRU may be different from its maximum rated current, but for simplicity, the maximum output current will be used as described herein.

Blocks 908-911 may generate a maximum output current of the PRU that will be generated when the PTU operates at its maximum current, irrespective of the nominal output current described above. For example, an alignment current received at the PRU (e.g., a current measured at the PRU during alignment of the PTU and the PRU) may be adjusted based on a topology (e.g., the structure of the PTU and/or PRU circuit(s)) to obtain an equivalent output current of the PRU. For example, the alignment current received at the PRU may be adjusted by a topology value of 2.22. In some embodiments, the topology value may be dependent upon a particular circuit topology of the PRU. Then, a percentage of the PTU alignment current in relation to the maximum current of the PTU may be identified to calculate or approximate what a theoretical maximum output current of the PRU would be when the PTU is at its own maximum base current, as these currents may be linearly related.

At block 912, the nominal output current identified at block 907 may be divided by the theoretical maximum output current identified at block 911. The result of block 912 may estimate a loading ratio (e.g., stress factor or capacity factor) of the PTU. At block 913 the target stress or loading ratio of the PTU is provided.

At block 914, the estimated loading ratio may be divided by the target loading ratio of the PTU provided in block 913 to generate a scalar value representing how much the actual loading ratio will vary from the target loading ratio (before applying balancing adjustment). This scalar value may correspond to the duty cycle offset of the PRU. In some implementations, the scalar value and the duty cycle offset/balancing duty cycle may maintain a (1-u) relationship.

If the actual loading ratio is less than the target loading ratio, then the active secondary component 735 or 535 of the PRU may divert, or "throw away," a portion of the current induced in the PRU while maintaining a specified or requested output current to its load. Accordingly, the PTU may push (e.g., generate) more current to compensate for the diverted current while maintaining the output current to the load of the PRU and, thus, the PTU may move closer to its ideal operating point. In the topology of FIG. 5, for example, switches in the active secondary 535 may be shorted for a given proportion of a switching cycle to achieve the desired dissipation. At block 915, the amount of power diverted or thrown away may be determined by the calculated duty cycle (e.g., the calculated duty cycle may be applied to the active secondary 535 of the PRU). Accordingly, the duty cycle may establish how much of output current of the PRU is diverted or "thrown away" to bring the PTU to a higher operating point (e.g., in the desired operating range). Block 916 may provide a limit on the final duty cycle adjustment of the PRU. In some ways, the limit of block 916 may function as a cap or maximum duty cycle adjustment allowed. At block 917, the capped or maximum duty cycle adjustment may be applied to the PRU, for example, to the active secondary 535 of the PRU.

Accordingly, the active secondary components 535 or 735 may compensate for output voltage variation. Additionally, loss balancing provided by the active secondary component 535 or 735 may serve as an additional benefit of this topology to increase system efficiency. For example, in some implementations, the active secondary may provide other core functionality, such that its use in loss balancing is an added benefit of the component.

Based on the description herein, known parameters and signals (e.g., parameters and signals known during alignment check) within the PTU and the PRU may be used to predict an operating point of the PTU. If the operating point is below the target (e.g., ideal) operating point of the PTU, the PRU may be adjusted (e.g., via the active secondary and the calculated duty cycle) to bring the PTU to the target operating point. The maximum added "stress factor" of the PRU may be accounted for by limiting the final duty cycle adjustment of the PRU to 30%. In some implementations, there may be a limit to how much stress is added to the PRU. In the example provided, this limit is 30%. However, in other implementations, this stress limit of the PRU may be varied. Such a stress limit may protect the PRU from having too much losses shifted to the PRU or from any mistakes in measurements, etc.

FIG. 10A is a graph showing losses on an antenna or circuit of a power transfer unit (PTU) of FIG. 6 as a function of a percentage of a maximum current in the antenna of the PTU, in accordance with exemplary implementations of the present disclosure. The graph 1000 shows a current draw for the PTU antenna 604 as a percentage in relation to maximum current draw along the x-axis and a resulting stress of the PTU 600 along the y-axis. The graph 1000 also indicates a desired operating region 1004 being between 65% and 85% along the x-axis. In some implementations, the stress may be measured in kilowatts (KW).

A line 1005 shows the relationship between the percentage of maximum current flow through the PTU antenna 604 and the resulting losses. The line 1005 shows that the stress of the PTU antenna 604 is at its lowest point (zero) at 0% current flow, with a steady but gradual increase to approximately 0.75 kW at 100% current flow (e.g., in an 11 kW transfer system). A line 1010 shows the relationship between the percentage of maximum current flow through electronics of the PTU 600 and the resulting losses. The line 1010 shows that the stress of the electronics of the PTU 600 is at its lowest point (approximately 0.125 kW) between 75% and 90% of maximum current flow. A line 1015 shows the total losses of the PTU 600 as a function of the current flow through its antenna 604 and its electronics. The line 1015 shows that the total stress of the PTU 600 is at its lowest point between approximately 65% and 80% of the maximum current.

In some implementations, various conditions may result in the total stress of the PTU 600 falling outside the desire operating range 1004. For example, point 1002a indicates a total stress of the PTU 600 at approximately 0.625 kW when the current of the PTU 600 is approximately 50% of its maximum. This may correspond to the example stress of the PTU 600 discussed in relation to method 800. However, in order to move the stress point 1002a of the PTU 600 into the desired operating range, the target stress may be adjusted (e.g., when adjusting the stress using Equation 2). Alternatively, the target current ratio between the PTU antenna 604 and the PRU antenna 704 may be adjusted (e.g., when adjusting the stress using Equation 3). Thus, the duty cycle of 0.23 may be generated based on Equation 2 and may move the stress point for the PTU 600 from 50% at point 1002a to 65% at point 1002b. In some implementations, the desired current ratios used in Equation 3 may be varied based on a target current ratio. Equations 2 and 3 may operate as two different methods for performing the balancing. For example, Equation 2 may aim for a specific target stress (e.g., may balance to a specified target stress of the PRU), while Equation 3 may aim for a specific current ratio between the PTU and the PRU (e.g., may balance to a specified target current ratio between the PTU and the PRU). Either equation (or other equations) may be used determine a balancing duty. For example, the method described in relation to FIG. 9 may be used to determine the balancing duty. Thus, in Equation 2, a target stress of 65% may be the specified target stress where lower losses are expected, while in Equation 3, a target current ratio of 0.8 may be the specified target current ratio where lower losses are expected.

Figure 10B:
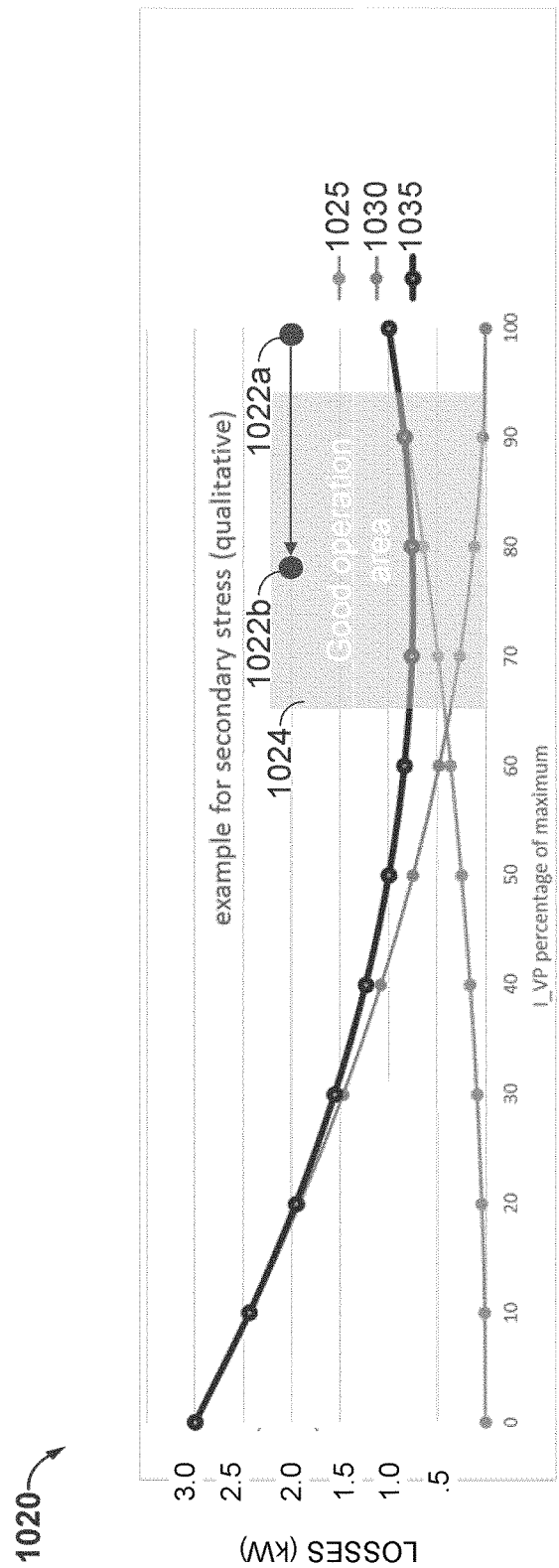
FIG. 10B is a graph showing losses on an antenna or circuit of a power receiving unit (PRU) of FIG. 7 as a function of a percentage of a maximum current in the antenna of the PRU, in accordance with exemplary implementations of the present disclosure.

FIG. 10B is a graph showing losses on an antenna or circuit of a power receiving unit (PRU) of FIG. 7 as a function of a percentage of a maximum current in the antenna of the PRU, in accordance with exemplary implementations of the present disclosure. The graph 1020 shows a current draw for the PRU antenna 704 as a percentage in relation to maximum current draw along the x-axis and a resulting stress of components of the PRU 700 along the y-axis. The graph 1020 also indicates the desired operating region 1024 being between 65% and 95% along the x-axis.

A line 1025 shows the relationship between the percentage of maximum current flow through the PRU antenna 704 and the resulting losses. The line 1025 shows that the stress of the PRU antenna 704 is at its lowest point (zero) at 0% current flow, with a steady but gradual increase to approximately 1.0 kW at 100% current flow (e.g., in the 11 kW system). A line 1030 shows the relationship between the percentage of maximum current flow through electronics of the PRU 700 and the resulting losses. The line 1030 shows that the stress of the electronics of the PRU 700 is at its lowest point (approximately zero kW) above 90% of maximum current flow. A line 1035 shows the total losses of the PRU 700 as a function of the current flow through its antenna 704 and its electronics. The line 1035 shows that the total stress of the PRU 700 is at its lowest point between approximately 65% and 80% of the maximum current.

In some implementations, various conditions of the wireless power transfer system 700 may result in the total stress of the PRU 700 falling outside the desire operating range 1004. For example, point 1022a indicates a total stress of the PRU 700 of approximately 1.0 kW when the current of the PRU 700 is approximately 100% of its maximum. For example, this may correspond to the example stress of the PRU 700 discussed in relation to method 800. However, in order to move the stress point 1022a of the PRU 700 into the desired operating range, the target stress may be adjusted (e.g., when adjusting the stress of the PTU 600 using Equation 2). Alternatively, or additionally, the stresses of the PTU 600 and the PRU 700 may be controlled by adjusting the duty cycle of the PRU 700 according to the desired current ratio. Alternatively, or additionally, the target current ratio between the PTU antenna 604 and the PRU antenna 704 may be adjusted (e.g., when adjusting the stress using Equation 3). Thus, the duty cycle of 0.21 may be generated based on Equation 3 and may move the stress point for the PRU 700 from 100% at point 1022a to approximately 79% at point 1022b.

Various advantages may be realized by utilizing the alignment check process between the PRU 700 and the PTU 600 for balancing pad and electronic stresses of the respective components. For example, utilizing the already standard alignment processor provides for the identification of existing stresses and stress balancing of the respective components without requiring or utilizing additional signals between the PRU 700 and the PTU 600. Accordingly, no changes to existing standard compliant communications between PTUs and PRUs may be needed. Furthermore, the systems and methods described herein may include automatic controls adjustment if the PTU and the PRU have different power levels, thereby maintaining full interoperability. Furthermore, the systems and methods described herein may guarantee to maintain a minimum inverter angle at nominal power. This can enable 100% soft switching in combination with good tuning and may limit inverter currents to a defined level.

Figure 11:
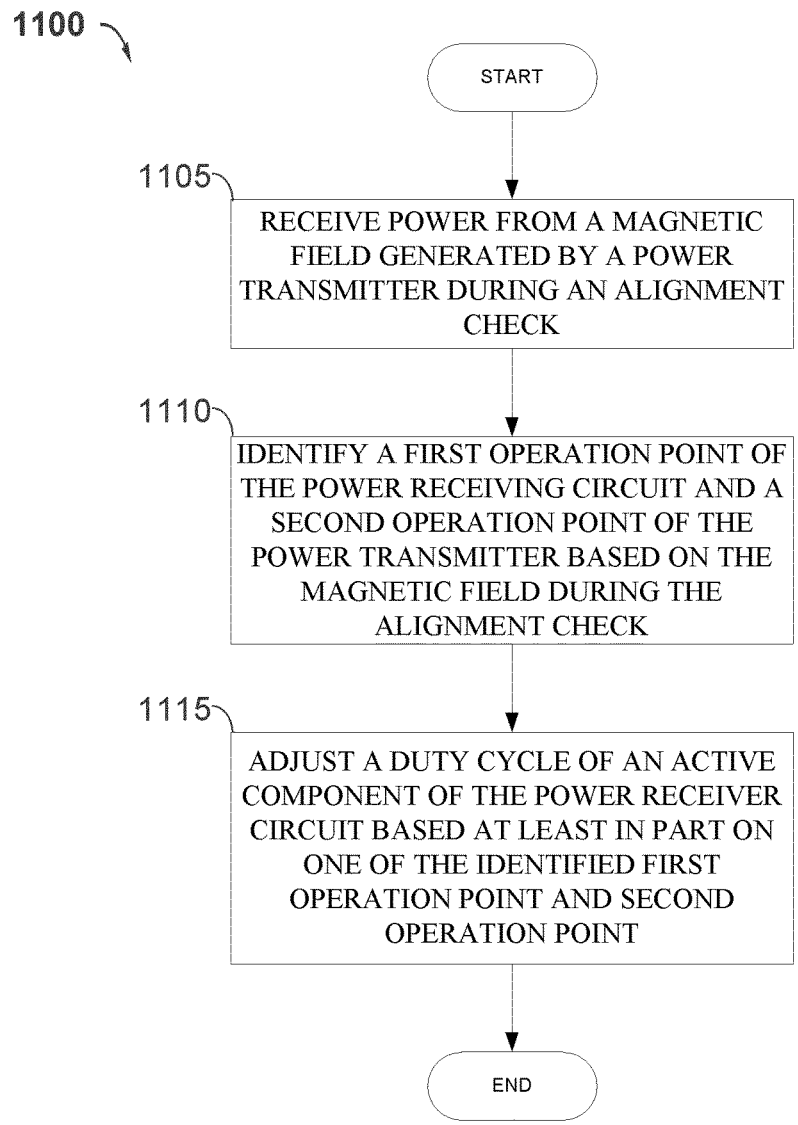
FIG. 11 is a flowchart that includes a plurality of steps of a method 1100 of receiving wireless power at a power receiving circuit, in accordance with exemplary implementations of the present disclosure.

FIG. 11 is a flowchart that includes a plurality of steps of a method 1100 of receiving wireless power at a power receiving circuit, in accordance with exemplary implementations of the present disclosure. Method 1100 may be performed by one or more of the components of the receiver or PRU 108, 208, 508, and 700. For example, the method 1100 could be performed by one or more of the components of the PRU 700 illustrated in FIG. 7. A person having ordinary skill in the art will appreciate that the method 1100 may be implemented by other suitable devices and systems. Although the method 1100 is described herein with reference to a particular order, in various implementations, blocks herein may be performed in a different order, or omitted, and additional blocks may be added.

The method 1100 begins at block 1105, where the PRU receives power from a magnetic field generated by a power transmitter during an alignment check. Once alignment check begins, the method 1100 proceeds to block 1110. At block 1110, during the alignment check, the PRU identifies a first operation point of the power receiving circuit and a second operation point of the power transmitter based on the magnetic field during the alignment check. The method 1100 then proceeds to block 1115. At block 1115, the PRU adjusts a duty cycle of an active component of the power receiving circuit based at least in part on one of the identified first operation point and second operation point.

An apparatus for receiving wireless power may perform one or more of the functions of method 1100, in accordance with certain implementations described herein. The apparatus may comprise means for receiving power from a magnetic field generated by a power transmitter during an alignment check. In certain implementations, the means for receiving power can be implemented by the receive antenna 704 or the receive circuitry 702 (FIG. 7). In some implementations, the means for receiving can be configured to perform the functions of block 1105 (FIG. 11). The apparatus may further comprise means for identifying a first operation point of the means for receiving power and a second operation point of the power transmitter based on the magnetic field during the alignment check. In certain implementations, the means for identifying can be implemented by the controller 716. In certain implementations, the means for identifying can be configured to perform the functions of block 1110 (FIG. 11). The apparatus may further comprise means for adjusting a duty cycle of an active component of the means for receiving power based at least in part on one of the identified first operation point and second operation point. In certain implementations, the means for adjusting the duty cycle can be implemented by the controller 716 or the active secondary component 735. In certain implementations, the means for adjusting can be configured to perform the functions of block 1115 (FIG. 11).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, means for generating a first induced current may comprise an antenna or other object configured to resonant when exposed to a wireless field generated by a transmitter. In some implementations, the means for generating a first induced current may be coupled to a receive antenna configured to receive power and/or data from the wireless field to which the means for generating a first induced current is coupled. In some implementations, this same means for generating a first induced current may be configured as a means for generating a wireless field when coupled to a power source. In some implementations, the means for generating a wireless field may be coupled to a transmit circuit. In some implementations, the means for emitting light may comprise a light emitting structure or device, such as a light bulb, an LED bulb, or any similar structure or component. In some implementations, the means for emitting light may be distributed along or about the means for generating a first induced current. In some implementations, the means for emitting light may be equally spaced along the means for generating a first induced current.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose hardware processor, a Digital Signal Processor (DSP), an Application Specified Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a hardware processor, or in a combination of the two. If implemented in software, the functions may be stored on or transmitted as one or more instructions or code on a tangible, non-transitory computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The hardware processor and the storage medium may reside in an ASIC.

For purposes of summarizing the disclosure, certain aspects, advantages and novel features s have been described herein. It is to be understood that not necessarily all such advantages may be achieved in accordance with any particular implementation. Thus, the present disclosure may be embodied or carried out in a manner that achieves or optimizes one advantage or group of advantages as taught herein without necessarily achieving other advantages as may be taught or suggested herein.

Various modifications of the above-described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for receiving wireless power, comprising:
   a power receiving circuit configured to couple to a magnetic field generated by a power transmitter during an alignment check; and
   a processing circuit configured to:
      measure, as a first operation point of the power receiving circuit, a short circuit current of the power receiving circuit while the magnetic field is generated by the power transmitter at an alignment current;
      identify a second operation point of the power transmitter based on the magnetic field during the alignment check, and
      adjust a duty cycle of an active component of the power receiving circuit based at least in part on one of the first operation point and second operation point.

2. The apparatus of claim 1, wherein identifying the first operation point of the power receiving circuit comprises:
   measuring a short circuit current of the power receiving circuit while the magnetic field is generated by the power transmitter at an alignment current; and
   comparing the first operation point with a short circuit current of a maximum load of the power receiving circuit.

3. The apparatus of claim 1, wherein identifying the second operation point of the power transmitter comprises comparing an alignment current of the power transmitter when generating the magnetic field with a maximum current of the power transmitter based on known current values stored in a memory circuit of the power receiving circuit.

4. The apparatus of claim 1, wherein identifying the second operation point of the power transmitter comprises comparing a power receiving circuit requested alignment current for generating the magnetic field with a known maximum current of the power transmitter stored in a memory circuit of the power receiving circuit.

5. The apparatus of claim 1, wherein adjusting the duty cycle of the active component comprises comparing the first operation point with a short circuit current of a maximum load of the power receiving circuit.

6. The apparatus of claim 1, further comprising selecting the desired operation point based on a target operation point of at least one of the power receiving circuit and the power transmitter.

7. The apparatus of claim 1, wherein adjusting the duty cycle of the active component comprises balancing losses between the power receiving circuit and the power transmitter based on the identified first and second operation points and a desired operation point of the power transmitter, wherein the first operation point is compared with a short circuit current of a maximum load of the power receiving circuit.

8. A method of receiving wireless power at a power receiving circuit, the method comprising:
   receiving power from a magnetic field generated by a power transmitter during an alignment check;
   measuring, as a first operation point of the power receiving circuit, a short circuit current of the power receiving circuit while the magnetic field is generated by the power transmitter at an alignment current;
   identifying a second operation point of the power transmitter based on the magnetic field during the alignment check; and
   adjusting a duty cycle of an active component of the power receiving circuit based at least in part on one of the first operation point and second operation point.

9. The method of claim 8, wherein identifying the first operation point of the power receiving circuit comprises:
   measuring a short circuit current of the power receiving circuit while the magnetic field is generated by the power transmitter at an alignment current; and
   comparing the first operation point with a short circuit current of a maximum load of the power receiving circuit.

10. The method of claim 8, wherein identifying the second operation point of the power transmitter comprises comparing an alignment current of the power transmitter when generating the magnetic field with a maximum current of the power transmitter based on known current values stored in a memory circuit of the power receiving circuit.

11. The method of claim 8, wherein identifying the second operation point of the power transmitter comprises comparing a power receiving circuit requested alignment current for generating the magnetic field with a known maximum current of the power transmitter stored in a memory circuit of the power receiving circuit.

12. The method of claim 8, wherein adjusting the duty cycle of the active component comprises comparing the first operation point with a short circuit current of a maximum load of the power receiving circuit.

13. The method of claim 8, further comprising selecting the desired operation point based on a target operation point of at least one of the power receiving circuit and the power transmitter.

14. The method of claim 8, wherein adjusting the duty cycle of the active component comprises balancing losses between the power receiving circuit and the power transmitter based on the identified first and second operation points and a desired operation point of the power transmitter, wherein the first operation point is compared with a short circuit current of a maximum load of the power receiving circuit.

15. An apparatus for receiving wireless power, the apparatus comprising:
   means for receiving power from a magnetic field generated by a power transmitter during an alignment check;
   means for measuring, as a first operation point of the means for receiving power, a short circuit current of the means for receiving power while the magnetic field is generated by the power transmitter at an alignment current;
   means for identifying a second operation point of the power transmitter based on the magnetic field during the alignment check; and
   means for adjusting a duty cycle of an active component of the means for receiving power based at least in part on one of the first operation point and second operation point.

16. The apparatus of claim 15, wherein the means for identifying the first operation point of the means for receiving power comprises:
   means for measuring a short circuit current of the means for receiving power while the magnetic field is generated by the power transmitter at an alignment current; and
   means for comparing the first operation point with a short circuit current of a maximum load of the means for receiving power.

17. The apparatus of claim 15, wherein the means for identifying the second operation point of the power transmitter comprises means for comparing an alignment current of the power transmitter when generating the magnetic field with a maximum current of the power transmitter based on known current values stored in a memory circuit of the means for receiving power.

18. The apparatus of claim 15, wherein the means for identifying the second operation point of the power transmitter comprises means for comparing a means for receiving power requested alignment current for generating the magnetic field with a known maximum current of the power transmitter stored in a memory circuit of the means for receiving power.

19. The apparatus of claim 15, wherein means for adjusting a duty cycle comprises comparing the first operation point with a short circuit current of a maximum load of the means for receiving power.

20. The apparatus of claim 15, further comprising means for selecting the desired operation point based on a target operation point of at least one of the means for receiving power and the power transmitter.

21. The apparatus of claim 15, wherein means for adjusting the duty cycle of the active component comprises means for balancing losses between the means for receiving power and the power transmitter based on the identified first and second operation points and a desired operation point of the power transmitter, wherein the first operation point is compared with a short circuit current of a maximum load of the means for receiving power.

* * * * *